(12) United States Patent
Pan et al.

(10) Patent No.: US 11,860,527 B2
(45) Date of Patent: Jan. 2, 2024

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Jo-Han Hsu, Hsin-Chu (TW); Kuan-Ta Huang, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/366,035

(22) Filed: Jul. 2, 2021

(65) Prior Publication Data
US 2022/0075252 A1 Mar. 10, 2022

(30) Foreign Application Priority Data

Sep. 4, 2020 (CN) .......................... 202010918648.2

(51) Int. Cl.
*G03B 33/08* (2006.01)
*G03B 21/20* (2006.01)
(52) U.S. Cl.
CPC ........... *G03B 33/08* (2013.01); *G03B 21/204* (2013.01); *G03B 21/2013* (2013.01)
(58) Field of Classification Search
None
See application file for complete search history.

(56) References Cited

U.S. PATENT DOCUMENTS

| 10,459,323 | B2 | 10/2019 | Liao |
| 2015/0181181 | A1* | 6/2015 | Fukano ................ G03B 21/204 353/31 |

(Continued)

FOREIGN PATENT DOCUMENTS

| CN | 101836160 | 2/2012 |
| CN | 103913937 | 7/2014 |

(Continued)

OTHER PUBLICATIONS

"Search Report of Europe Counterpart Application", dated Dec. 20, 2021, p. 1-p. 8.

(Continued)

*Primary Examiner* — Bao-Luan Q Le
*Assistant Examiner* — Danell L Owens
(74) *Attorney, Agent, or Firm* — JCIPRNET

(57) ABSTRACT

An illumination system including an excitation light source array, a multi-region dichroic device, a color sequence generator, and a wavelength converter is provided. The excitation light source array emits excitation light beams. The multi-region dichroic device has first dichroic regions and non-dichroic regions that are alternately arranged in stripe shapes. The first dichroic regions are respectively disposed on transmission paths of the excitation light beams. The excitation light beams from the excitation light source array are transmitted to the color sequence generator through the first dichroic regions of the multi-region dichroic device, and at least one second dichroic region of the color sequence generator respectively reflects the excitation light beams to the non-dichroic regions of the multi-region dichroic device. The excitation light beams from the color sequence generator are transmitted to the wavelength converter through the non-dichroic regions of the multi-region dichroic device. A projection apparatus is also provided.

20 Claims, 10 Drawing Sheets

(56) References Cited

U.S. PATENT DOCUMENTS

| | | | |
|---|---|---|---|
| 2019/0110030 A1* | 4/2019 | Chiu | H04N 9/3158 |
| 2019/0238803 A1 | 8/2019 | Tsai et al. | |
| 2019/0253676 A1* | 8/2019 | Tsai | H01L 33/50 |
| 2019/0331990 A1* | 10/2019 | Zhang | G03B 21/204 |
| 2019/0331997 A1* | 10/2019 | Pan | G03B 21/208 |
| 2019/0369470 A1* | 12/2019 | Yang | G03B 21/2066 |

FOREIGN PATENT DOCUMENTS

| | | | | |
|---|---|---|---|---|
| CN | 204028554 | | 12/2014 | |
| CN | 207799321 | | 8/2018 | |
| CN | 106125475 | | 10/2018 | |
| CN | 208255611 | | 12/2018 | |
| CN | 208547803 | | 2/2019 | |
| CN | 110554554 | | 12/2019 | |
| CN | 209765253 | | 12/2019 | |
| EP | 3654100 | | 5/2020 | |
| JP | 2019207314 A | * | 12/2019 | G02B 26/008 |

OTHER PUBLICATIONS

"Office Action of China Counterpart Application", dated Jan. 10, 2023, p. 1-p. 11.

* cited by examiner

ILLUMINATION SYSTEM AND PROJECTION APPARATUS

CROSS-REFERENCE TO RELATED APPLICATION

This application claims the priority benefit of China application serial no. 202010918648.2, filed on Sep. 4, 2020. The entirety of the above-mentioned patent application is hereby incorporated by reference herein and made a part of this specification.

BACKGROUND

Technical Field

The disclosure relates to an optical system and an apparatus, and particularly relates to an illumination system and a projection apparatus.

Description of Related Art

Light source technology used in projectors has evolved from ultra-high pressure mercury lamps to red, green, and blue light-emitting diodes, and then to laser diode light sources along with market's requirements on projection brightness, color saturation, service life, and non-toxic environmental protection. Since the current high-brightness green laser diodes have not yet reached an appropriate price for projector applications, a main method currently used is to use a blue laser diode to excite a phosphor wheel to generate yellow green light, a color wheel is then used to filter out the required red and green light to be matched with blue light generated by the blue laser diode, and the three primary colors of red, green, and blue required for a projection image are thereby formed.

However, in order to use the blue light generated by the blue laser diode as one of the three primary colors, a metal substrate of the phosphor wheel is provided with a hollow region and is inlaid with transparent glass, so that the blue light may penetrate through the phosphor wheel. Since the metal substrate is a substrate with a notch, in order to ensure that the phosphor wheel is to rotate in a balanced manner, dynamic balance weights are set in different regions on the metal substrate to reduce an eccentric phenomenon of the phosphor wheel in rotation. The various features of the above-mentioned phosphor wheel may increase structural and assembly complexity of the phosphor wheel, thereby increasing the costs of the phosphor wheel.

The information disclosed in this BACKGROUND section is only for enhancement of understanding of the background of the described technology, and therefore it may contain information that does not form the prior art that is already known to a person of ordinary skill in the art. Further, the information disclosed in the BACKGROUND section does not mean that one or more problems to be resolved by one or more embodiments of the invention was acknowledged by a person of ordinary skill in the art.

SUMMARY

The disclosure is directed to an illumination system, which is adapted to effectively simplify a structure of a wavelength converter, increase a structural strength and a heat dissipation area of the wavelength converter, shorten dynamic balance adjustment work hours of the wavelength converter, simplify light paths of the illumination system, reduce a volume of the illumination system, and reduce complexity of electronic control, and that costs of the illumination system are effectively reduced.

The disclosure provides a projection apparatus, which is adapted to effectively simplify a structure of a wavelength converter, increase a structural strength and a heat dissipation area of the wavelength converter, shorten dynamic balance adjustment work hours of the wavelength converter, simplify light paths of an illumination system, reduce a volume of the illumination system, and reduce complexity of electronic control, and that costs of the projection apparatus are effectively reduced.

An embodiment of the disclosure provides an illumination system including an excitation light source array, a multi-region dichroic device, a color sequence generator, and a wavelength converter. The excitation light source array is configured to emit a plurality of excitation light beams. The multi-region dichroic device has a plurality of first dichroic regions and a plurality of non-dichroic regions that are alternately arranged in stripe shapes, wherein the first dichroic regions are respectively arranged on transmission paths of the excitation light beams. The color sequence generator has a light-transmitting region and at least one second dichroic region, wherein the excitation light beams from the excitation light source array are transmitted to the color sequence generator through the first dichroic regions of the multi-region dichroic device, and the light-transmitting region and the at least one second dichroic region are sequentially cut into the transmission paths of the excitation light beams. When the light-transmitting region is located on the transmission paths of the excitation light beams, the excitation light beams penetrate through the light-transmitting region. When the at least one second dichroic region is located on the transmission paths of the excitation light beams, the at least one second dichroic region respectively reflects the excitation light beams to the non-dichroic regions of the multi-region dichroic device. The excitation light beams from the color sequence generator are transmitted to the wavelength converter through the non-dichroic regions of the multi-region dichroic device. The wavelength converter converts the excitation light beams into a converted light beam. The converted light beam is transmitted back to the multi-region dichroic device, the converted light beam is transmitted to the color sequence generator through the multi-region dichroic device, and at least a portion of the converted light beam penetrates through the at least one second dichroic region.

An embodiment of the disclosure provides a projection apparatus including the aforementioned illumination system, a light valve, and a projection lens. The light valve is arranged on the transmission paths of the excitation light beams and the converted light beam coming from the color sequence generator to convert the excitation light beams and the converted light beam into an image light beam. The projection lens is arranged on a transmission path of the image light beam to project the image light beam out of the projection apparatus.

In the illumination system and the projection apparatus of the embodiments of the disclosure, the excitation light beams emitted by the excitation light source array are transmitted to the color sequence generator and then divided into passing light beams and light beams reflected to the wavelength converter. As such, the structure of the wavelength converter may be effectively simplified, the structural strength and the heat dissipation area of the wavelength converter are increased, the dynamic balance adjustment work hours of the wavelength converter are shortened, the light paths of the illumination system are simplified, and the volume of the illumination system is reduced, and complexity of electronic control is decreased, and that the costs of the illumination system are effectively reduced.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
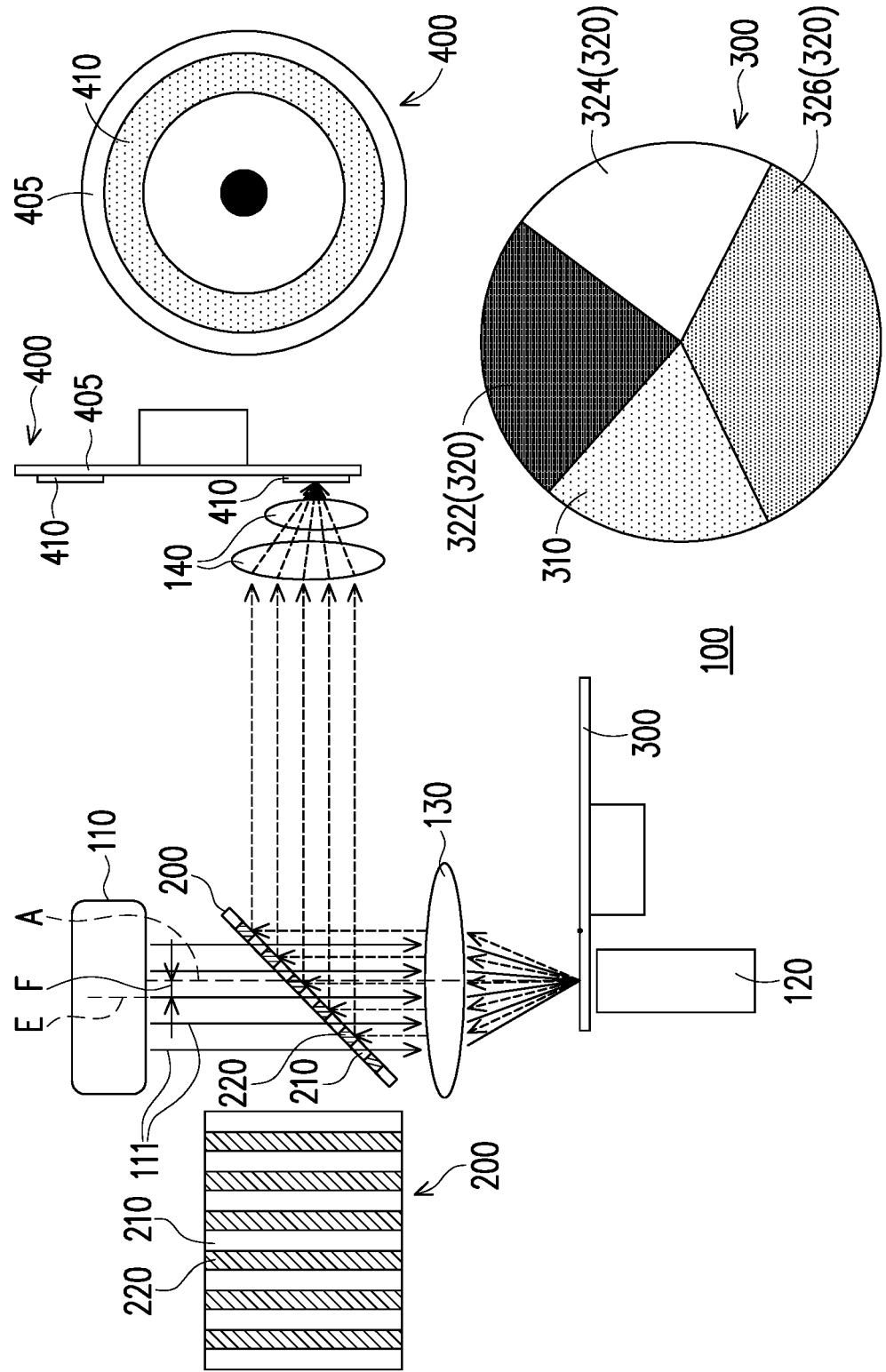
FIG. 1A is a light path schematic diagram of excitation light beams of an illumination system according to an embodiment of the disclosure.
Figure 1B:
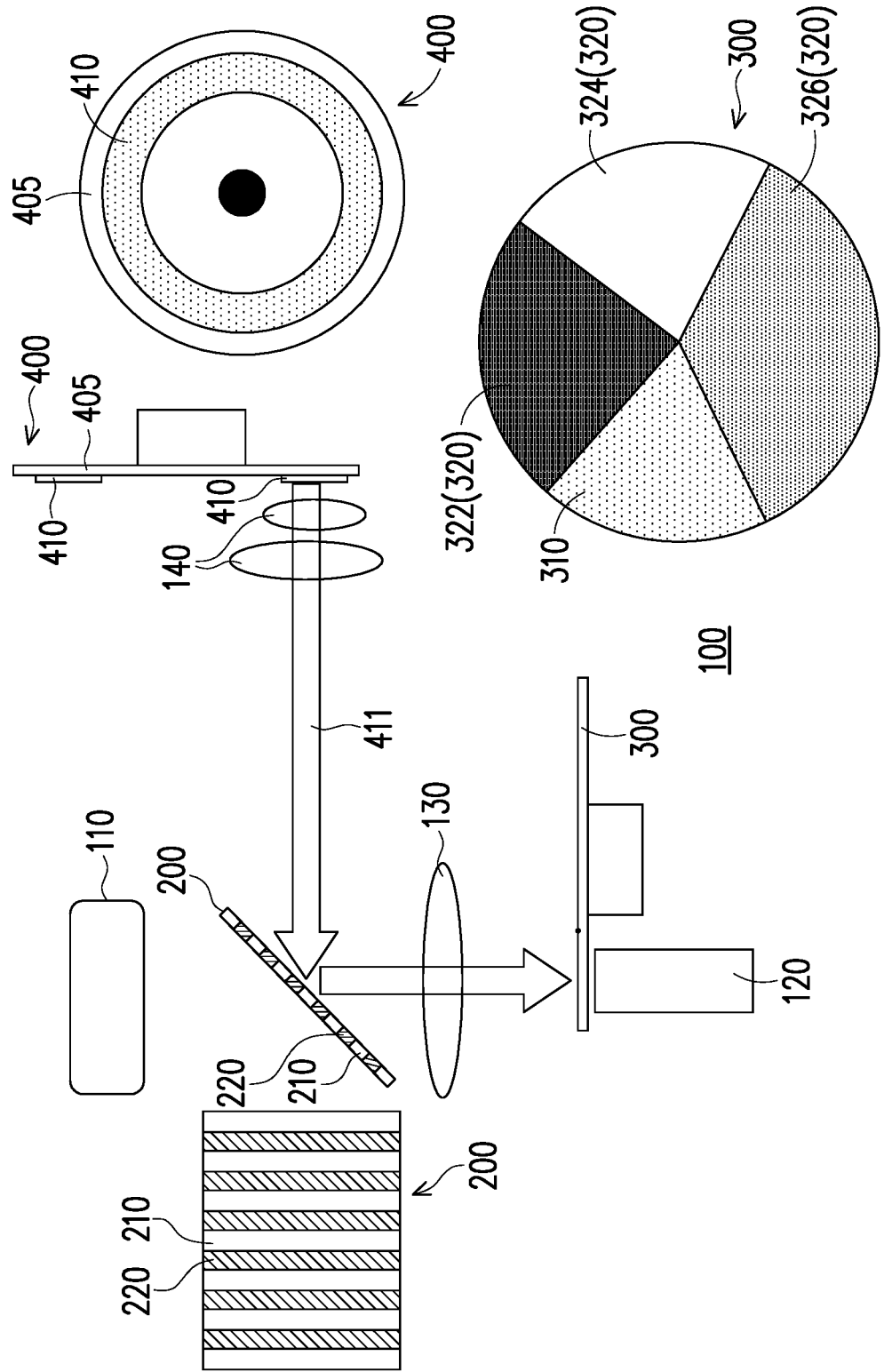
FIG. 1B is a light path schematic diagram of a converted light beam of the illumination system of FIG. 1A.
Figure 1C:
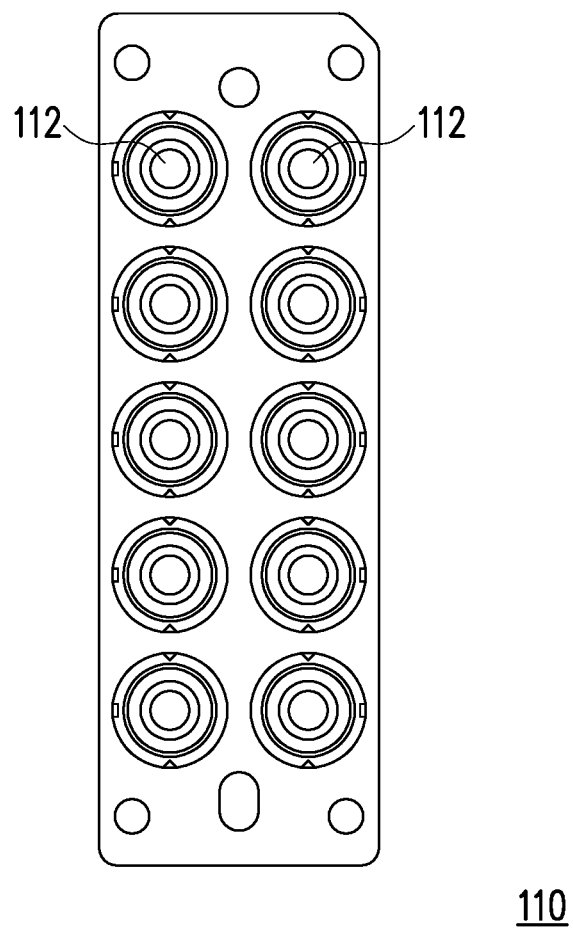
FIG. 1C is a schematic front view of an excitation light source array of FIG. 1A.

FIG. 1A is a light path schematic diagram of excitation light beams of an illumination system according to an embodiment of the disclosure, FIG. 1B is a light path schematic diagram of a converted light beam of the illumination system of FIG. 1A, and FIG. 1C is a schematic front view of an excitation light source array of FIG. 1A. Referring to FIG. 1A, FIG. 1B, and FIG. 1C, an illumination system 100 of the embodiment includes an excitation light source array 110, a multi-region dichroic device 200, a color sequence generator 300, a wavelength converter 400, and a light uniformizing element 120. Front views of the multi-region dichroic device 200, the color sequence generator 300, and the wavelength converter 400 are respectively illustrated next to the light path diagrams of FIG. 1A and FIG. 1B. The excitation light source array 110 is configured to emit a plurality of excitation light beams 111. In the embodiment, the excitation light source array 110 includes a plurality of light emitting elements 112 arranged in an array. The excitation light source array 110 is, for example, a laser diode array, and the light emitting elements 112 are, for example, laser diodes. However, in other embodiments, the light emitting elements 112 may also be light emitting diodes or other light emitting elements. In the embodiment, the excitation light beams 111 are, for example, blue light beams.

The multi-region dichroic device 200 has a plurality of first dichroic regions 210 and a plurality of non-dichroic regions 220 arranged alternately in stripe shapes, where the first dichroic regions 210 are respectively arranged on transmission paths of the excitation light beams 111.

The color sequence generator 300 has a light-transmitting region 310 and at least one second dichroic region 320 (in FIG. 1A, three second dichroic regions 322, 324, and 326 are taken as an example for description), where the excitation light beams 111 from the excitation light source array 110 are transmitted to the color sequence generator 300 through the first dichroic regions 210 of the multi-region dichroic device 200.

In the embodiment, the first dichroic regions 210 are, for example, formed by a plurality of dichroic films that are spaced apart from each other and coated on a surface of a transparent substrate (for example, the surface facing away from the excitation light source array 110), and the dichroic films allow the blue light beams (i.e., the excitation light beams 111) to penetrate through and reflect light beams of other colors. In other words, the first dichroic regions 210 respectively allow the excitation light beams 111 to penetrate through and transmit the same to the color sequence generator 300.

In the embodiment, the color sequence generator 300 is, for example, a color wheel, which includes the light-transmitting region 310 and the at least one second dichroic region 320 (for example, the second dichroic regions 322, 324, and 326); the color sequence generator 300 is suitable for rotating so that the light-transmitting region 310 and the second dichroic regions 322, 324, and 326 are sequentially cut into the transmission paths of the excitation light beams 111, where the light-transmitting region 310 of the color sequence generator 300 may be a light diffusing region, which may diffuse the blue excitation light beams (i.e., the excitation light beams 111) to achieve an effect of suppressing a speckle phenomenon, and the second dichroic regions 322, 324, and 326, for example, respectively allow red light, yellow light, and green light to penetrate through.

When the light-transmitting region 310 is located on the transmission paths of the excitation light beams 111, the excitation light beams 111 penetrate through the light-transmitting region 310 and are transmitted to the light uniformizing element 120. When the at least one second dichroic region 320 is located on the transmission paths of the excitation light beams 111, the at least one second dichroic region 320 respectively reflects the excitation light beams 111 to the non-dichroic regions 220 of the multi-region dichroic device 200. The excitation light beams 111 reflected from the color sequence generator 300 are transmitted to the wavelength converter 400 through the non-dichroic regions 220 of the multi-region dichroic device 200. In the embodiment, the non-dichroic regions 220 are, for example, a plurality of reflective mirror regions respectively reflecting the excitation light beams 111 reflected by the at least one second dichroic region 320 to the wavelength converter 400. In the embodiment, the reflective mirror regions are, for example, formed by a plurality of reflective films that are spaced apart from each other and coated on a surface of a transparent substrate (for example, the surface facing away from the excitation light source array 110), and the reflective films are, for example, metallic coating films or non-metallic reflective films.

The wavelength converter 400 converts the excitation light beams 111 into a converted light beam 411. The converted light beam 411 is transmitted back to the multi-region dichroic device 200, the converted light beam 411 is transmitted to the color sequence generator 300 through the multi-region dichroic device 200, and at least a portion of the converted light beam 411 penetrates through the at least one second dichroic region 320.

In the embodiment, the wavelength converter 400 is a wavelength conversion wheel suitable for rotation and has a wavelength conversion region 410. The wavelength conversion region 410 is a complete ring-shaped region, and when the wavelength conversion wheel rotates, the excitation light beams 111 irradiate within the complete ring-shaped region. In the embodiment, the wavelength conversion region 410 is, for example, provided with a phosphor layer. The wavelength converter 400 has a reflective substrate 405, such as a metal substrate, and the wavelength conversion region 410 is, for example, formed by a phosphor layer coated on a surface of the reflective substrate 405. The reflective substrate 405 may present a complete round shape (a disk shape). In the embodiment, when the excitation light beam 111 of the blue color irradiates the phosphor layer, it excites the converted light beam 411 with a yellow-green color, and the reflective substrate 405 reflects at least a portion of the converted light beam 411 transmitted toward the reflective substrate 405 to the multi-region dichroic device 200.

In the embodiment, when the converted light beam 411 with the yellow-green color from the wavelength converter 400 is transmitted back to the first dichroic regions 210 and the non-dichroic regions 220 of the multi-region dichroic device 200, the first dichroic regions 210 are used to reflect light beams of other colors except for the blue light beams, and the non-dichroic regions 220 are used to reflect all of the light beams. Therefore, the first dichroic regions 210 and the non-dichroic regions 220 may all reflect the converted light beam 411 to the color sequence generator 300. At this moment, the converted light beam 411 with the yellow-green color irradiates the second dichroic regions 320 and is filtered by the second dichroic regions 320. For example, the second dichroic regions 322, 324, and 326 are sequentially cut into a transmission path of the converted light beam 411, and a portion of the converted light beam 411 sequentially penetrates through the second dichroic regions 322, 324, and 326 to respectively form a red light beam, a yellow light beam and a green light beam for being transmitted to the light uniformizing element 120. In this way, in collaboration with the excitation light beams 111 of the blue color that penetrate through the light-transmitting region 310 when the light-transmitting region 310 is cut into the transmission paths of the excitation light beams 111, the illumination system 100 may sequentially provide the blue light beam, the red light beam, the yellow light beam, and the green light beam to a subsequent light valve (which will be introduced in the following content) to form a color image. In addition, the excitation light beams 111 and the converted light beam 411 penetrating through the color sequence generator 300 may be transmitted to the light uniformizing element 120 to uniformize an intensity distribution of light beam. In the embodiment, the light uniformizing element 120 is a light integration rod. However, in other embodiments, the light uniformizing element 120 may also be a lens array.

In the embodiment, the illumination system 100 further includes a light converging lens 130 disposed between the multi-region dichroic device 200 and the color sequence generator 300, the light converging lens 130 is configured to converge the excitation light beams 111 from the first dichroic regions 210 on the color sequence generator 300, and the light converging lens 30 is configured to transmit the excitation light beams 111 reflected by the at least one second dichroic region 320 to the non-dichroic regions 220. In the embodiment, a central optical axis A of the light converging lens 130 has an off-axis amount F relative to a central optical axis E of the excitation light source array 110, i.e., a distance between the central optical axis A of the light converging lens 130 and the central optical axis E of the excitation light source array 110 is greater than zero, in this way, a light path of the excitation light beams 111 passing through the light converging lens 130 and a light path of the excitation light beams 111 reflected by the at least one second dichroic region 320 and passing through the light converging lens 130 are not overlapped. The off-axis amount F is configured to make the excitation light beams 111 originally penetrating through the first dichroic regions 210 and reflected by the at least one second dichroic region 320 of the color sequence generator 300 be transmitted to the non-dichroic regions 220 adjacent to the adjacent first dichroic regions 210 (for example, the adjacent non-dichroic regions 220 located at the upper right of the first dichroic regions 210 in FIG. 1A).

In the embodiment, the illumination system 100 further includes at least one light converging lens 140 (two light converging lenses 140 are taken as an example for description in FIG. 1A), which are arranged between the multi-region dichroic device 200 and the wavelength converter 400, where the light converging lens 140 converges the excitation light beams 111 on the wavelength converter 400, i.e., to the phosphor layer, so as to increase the energy of exciting the phosphor layer.

In the illumination system 100 of the embodiment, since the excitation light beams 111 emitted by the excitation light source array 110 are transmitted to the color sequence generator 300 to form passing light beams and light beams reflected to the wavelength converter 400 at different timings, the structure of the wavelength converter 400 may be effectively simplified. For example, the reflective substrate 405 of the wavelength converter 400 may accordingly present a complete round shape without a notch, which may increase a structural strength and a heat dissipation area of the wavelength converter 400. Since the reflective substrate 405 presents the complete round shape, the wavelength converter 400 itself is relatively balanced and symmetrical, and dynamic balance adjustment work hours of the wavelength converter 400 may be shortened. In addition, compared to the prior art where the blue light passing through the notch of the phosphor wheel is combined with phosphor light in a manner of reflecting by a plurality of mirrors, in the embodiment, the multi-region dichroic device 200 and the color sequence generator 300 are used to split light, which may simplify the light paths of the illumination system 100 to reduce a volume of the illumination system 100. Moreover, in the illumination system 100 of the embodiment, the wavelength conversion region 410 on the wavelength converter 400 is a complete ring-shaped region, so that the rotation of the color sequence generator 300 and the rotation of the wavelength converter 400 may not be synchronized. In this way, complexity of electronic control is reduced, and the costs of the illumination system 100 are effectively lowered.

Figure 2:
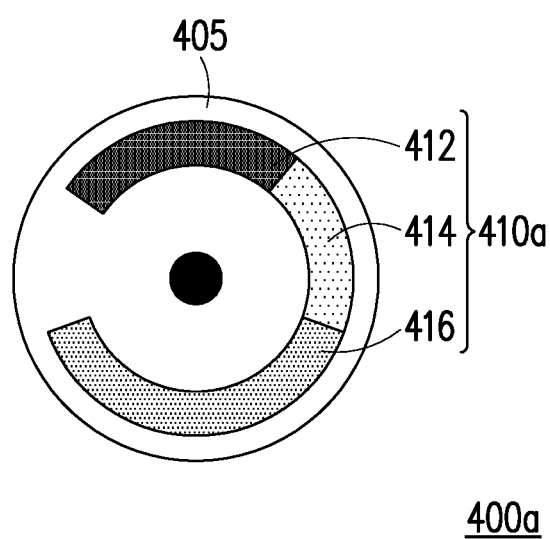
FIG. 2 is a schematic front view of a wavelength converter of an illumination system according to another embodiment of the disclosure.

FIG. 2 is a schematic front view of a wavelength converter of an illumination system according to another embodiment of the disclosure. Referring to FIG. 1A and FIG. 2, the illumination system of the embodiment is similar to the illumination system 100 of FIG. 1A, and a difference there between is that the illumination system of the embodiment adopts a wavelength converter 400a to replace the wavelength converter 400 in the illumination system 100 of FIG. 1A. In the wavelength converter 400a of the embodiment, a wavelength conversion region 410a is a C-shaped region, and when the wavelength converter 400a rotates, the excitation light beams 111 irradiate within the C-shaped region.

In the embodiment, the wavelength conversion region 410a is, for example, provided with three types of phosphor layers (wavelength conversion layers). The wavelength conversion region 410a is provided with a first wavelength conversion layer 412, a second wavelength conversion layer 414, and a third wavelength conversion layer 416. The first wavelength conversion layer 412, the second wavelength conversion layer 414, and the third wavelength conversion layer 416 are sequentially cut into the transmission paths of the excitation light beams 111 coming from the multi-region dichroic device 200. When the first wavelength conversion layer 412 is located on the transmission paths of the excitation light beams 111, the first wavelength conversion layer 412 converts the excitation light beams 111 into a first converted light beam. When the second wavelength conversion layer 414 is located on the transmission paths of the excitation light beams 111, the second wavelength conversion layer 414 converts the excitation light beams 111 into a second converted light beam. When the third wavelength conversion layer 416 is located on the transmission paths of the excitation light beams 111, the third wavelength conversion layer 416 converts the excitation light beams 111 into a third converted light beam. The first converted light beam, the second converted light beam, and the third converted light beam are sequentially reflected to the multi-region dichroic device 200 by the reflective substrate 405, and then reflected to the color sequence generator 300 by the multi-region dichroic device 200. The at least one second dichroic region 320 includes a first color filter region corresponding to the first converted light beam (i.e., the second dichroic region 322), a second color filter region corresponding to the second converted light beam (i.e., the second dichroic region 324), and a third color filter region corresponding to the third converted light beam (i.e., the second dichroic region 326) for respectively allowing a portion of the first converted light beam, a portion of the second converted light beam, and a portion of the third converted light beam to penetrate through. For example, the first converted light beam, the second converted light beam, and the third converted light beam are, for example, respectively an orange light beam, a yellow light beam, and a green light beam, and the second dichroic region 322, the second dichroic region 324, and the second dichroic region 326 may, for example, respectively filter the orange light beam, the yellow light beam, and the green light beam into a red light beam, a purer yellow light beam and a purer green light beam. In other embodiments, the wavelength conversion region 410a may also have only two wavelength conversion layers, such as the first wavelength conversion layer 412 and the third wavelength conversion layer 416, and the second dichroic region 320 may also have only two color filter regions, such as the second dichroic region 322 and the second dichroic region 326, but the disclosure does not limit the numbers of the wavelength conversion layers and the color filter regions. In addition, in the embodiment, the rotation of the color sequence generator 300 and the rotation of the wavelength converter 400a are synchronized, and the two may be synchronized by a synchronization circuit electrically connected to the color sequence generator 300 and the wavelength converter 400a.

Figure 3:
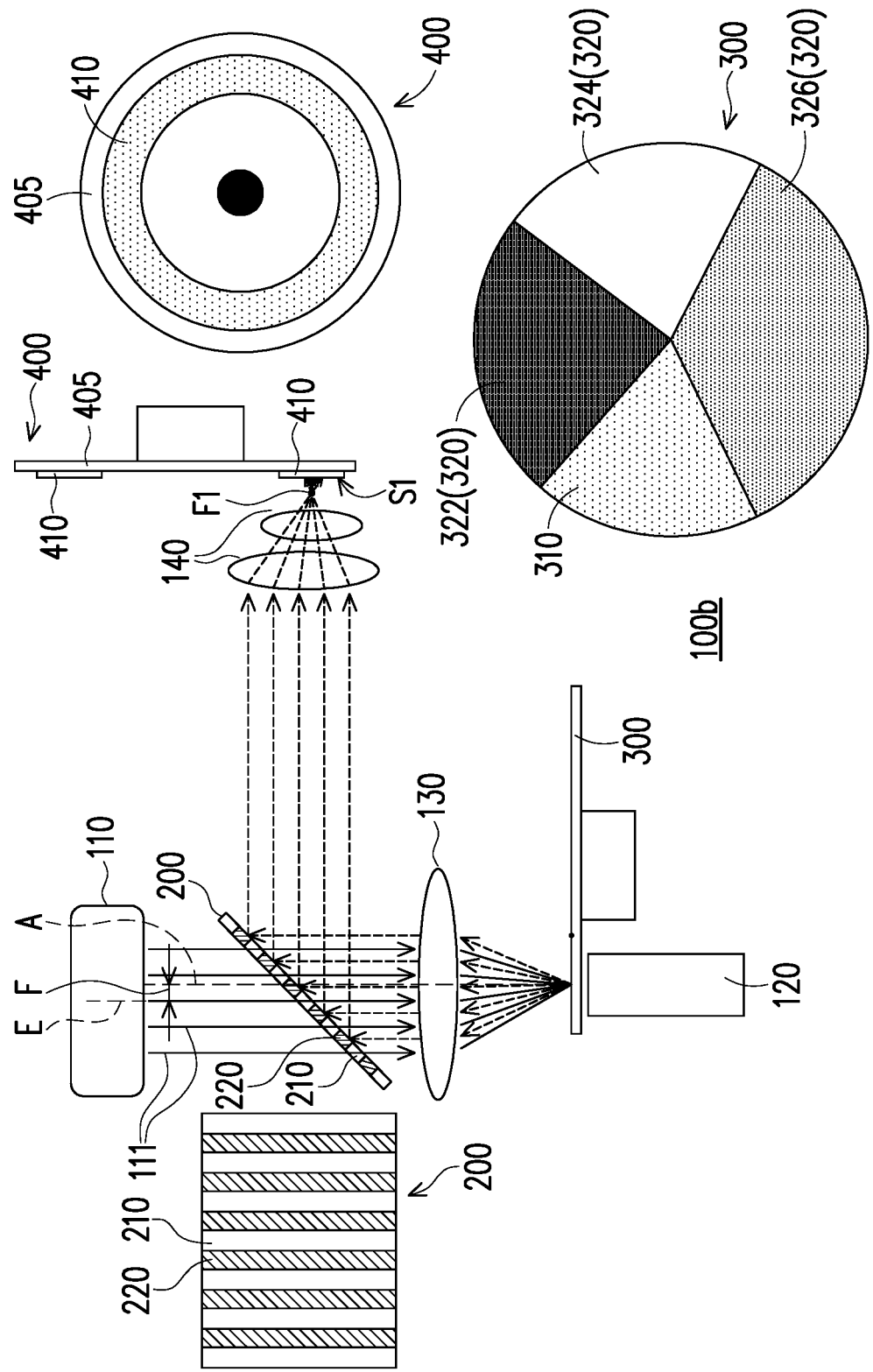
FIG. 3 is a light path schematic diagram of excitation light beams of an illumination system according to another embodiment of the disclosure.

FIG. 3 is a light path schematic diagram of excitation light beams of an illumination system according to another embodiment of the disclosure. Referring to FIG. 3, an illumination system 100b of the embodiment is similar to the illumination system 100 of FIG. 1, and differences there between are as follows. In the illumination system 100b of the embodiment, a focal point F1 at which the excitation light beams 111 are converged by the light converging lens 140 is not coincided with a wavelength conversion surface S1 of the wavelength converter 400, and the wavelength conversion surface S1 is, for example, a surface of the phosphor layer or a surface of the reflective substrate 405. In this way, a light spot irradiated on the phosphor layer (the wavelength conversion layer) of the wavelength converter 400 becomes large, a peak value of light intensity of the light spot is thereby reduced, and a risk that the phosphor layer is burned by heat is also lowered.

Figure 4A:
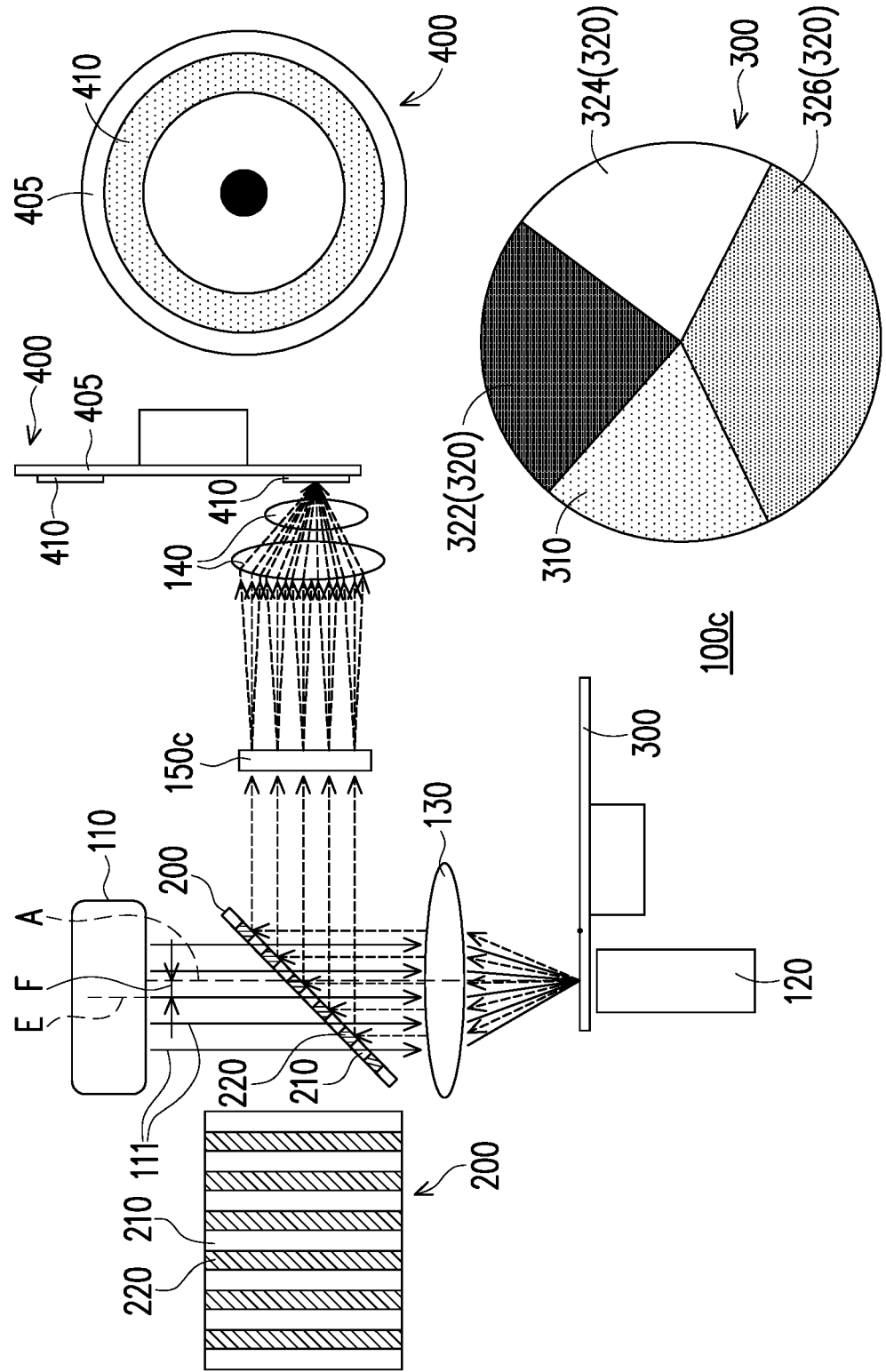
FIG. 4A is a light path schematic diagram of excitation light beams of an illumination system according to still another embodiment of the disclosure.
Figure 4B:
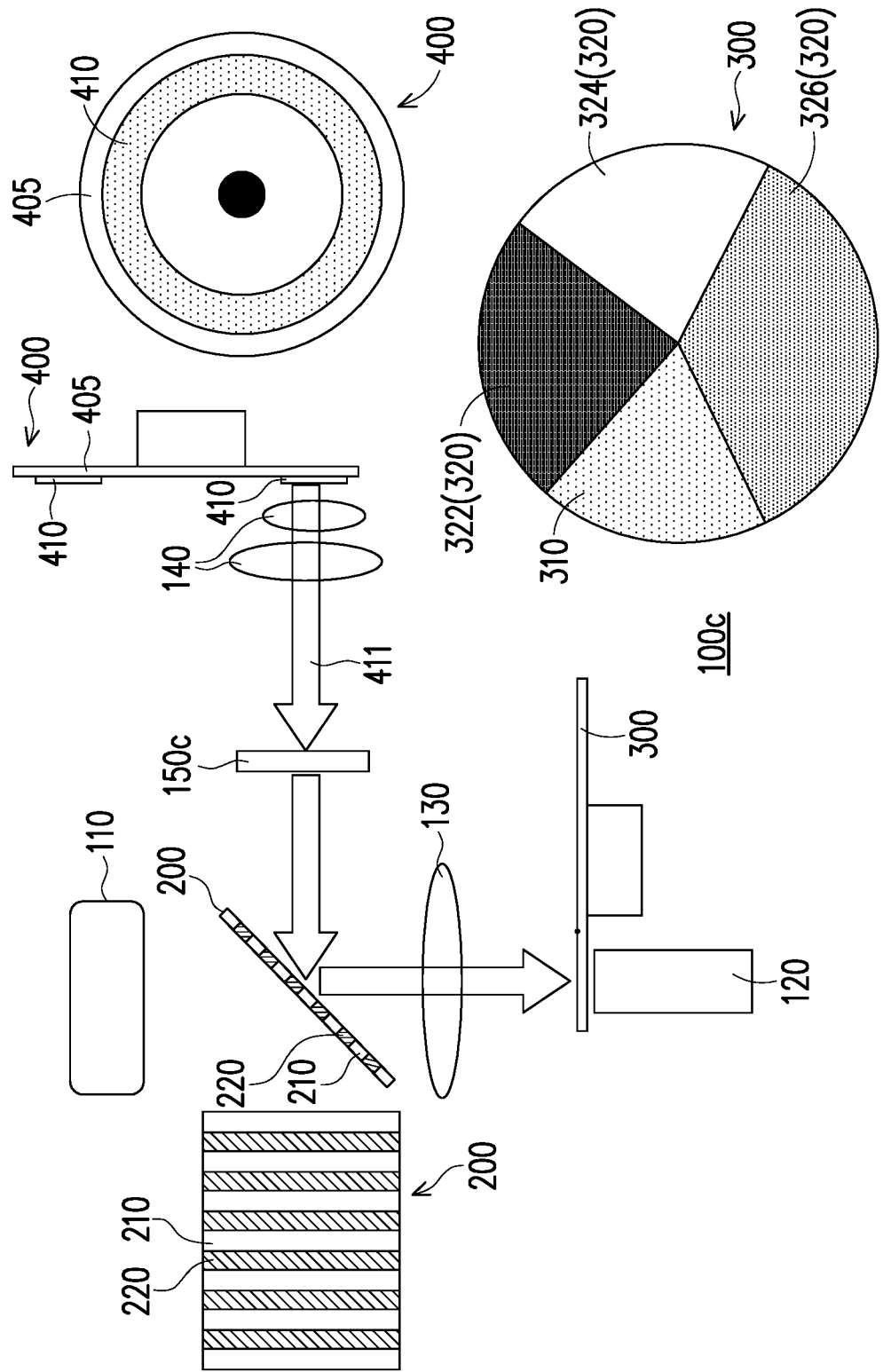
FIG. 4B is a light path schematic diagram of a converted light beam of the illumination system of FIG. 4A.

FIG. 4A is a light path schematic diagram of excitation light beams of an illumination system according to still another embodiment of the disclosure, and FIG. 4B is a light path schematic diagram of a converted light beam of the illumination system of FIG. 4A. Referring to FIG. 4A and FIG. 4B, an illumination system 100c of the embodiment is similar to the illumination system 100 of FIG. 1A, and differences there between are as follows. The illumination system 100c of the embodiment further includes a lens array or a diffuser plate 150c disposed between the multi-region dichroic device 200 and the wavelength converter 400 to uniformize light spots of the excitation light beams 111 formed on the wavelength converter 400. In this way, a peak value of light intensity of the light spots is reduced, and the risk that the phosphor layer is burned by heat is also lowered.

Figure 5A:
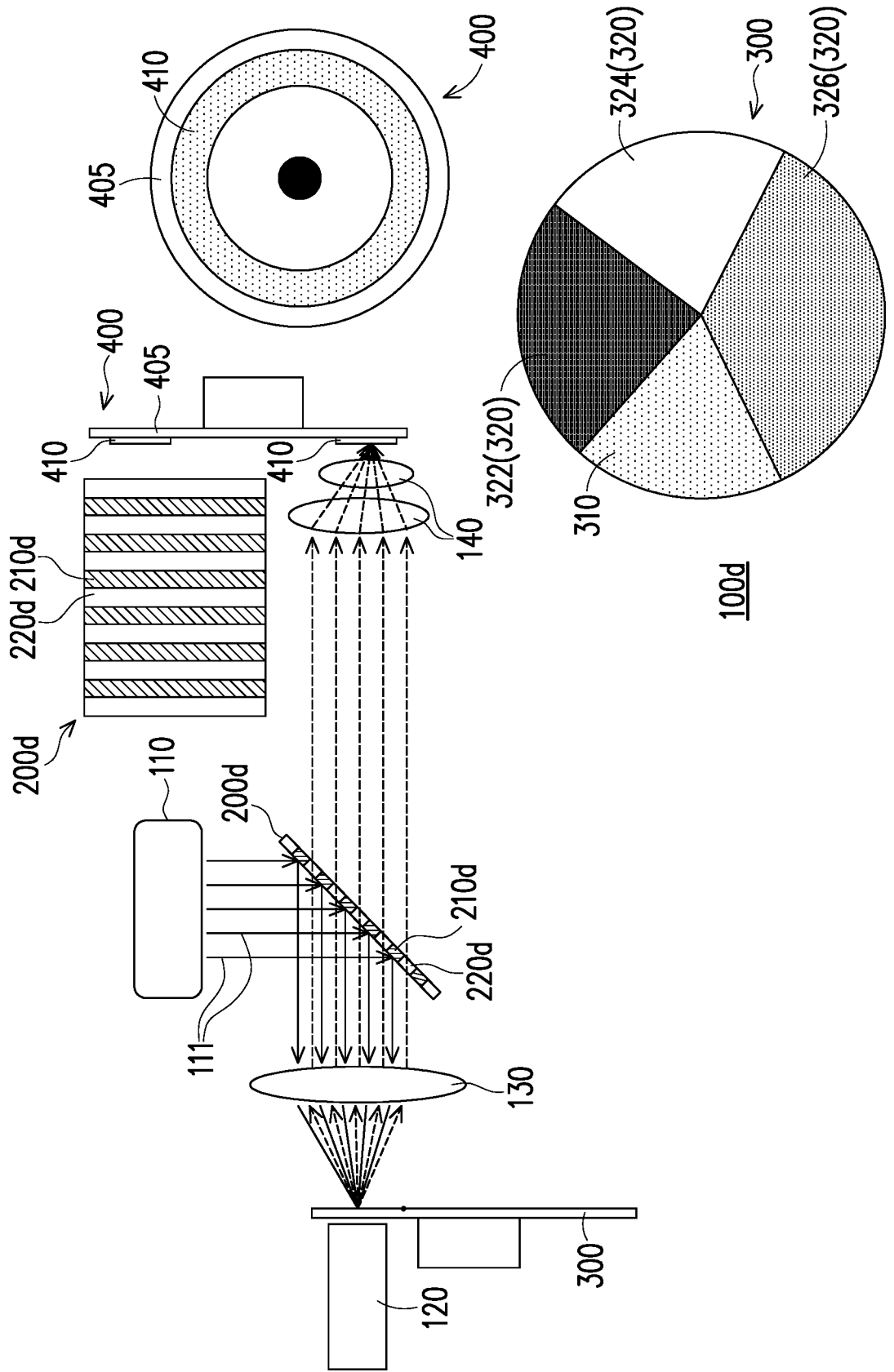
FIG. 5A is a light path schematic diagram of excitation light beams of an illumination system according to yet another embodiment of the disclosure.
Figure 5B:
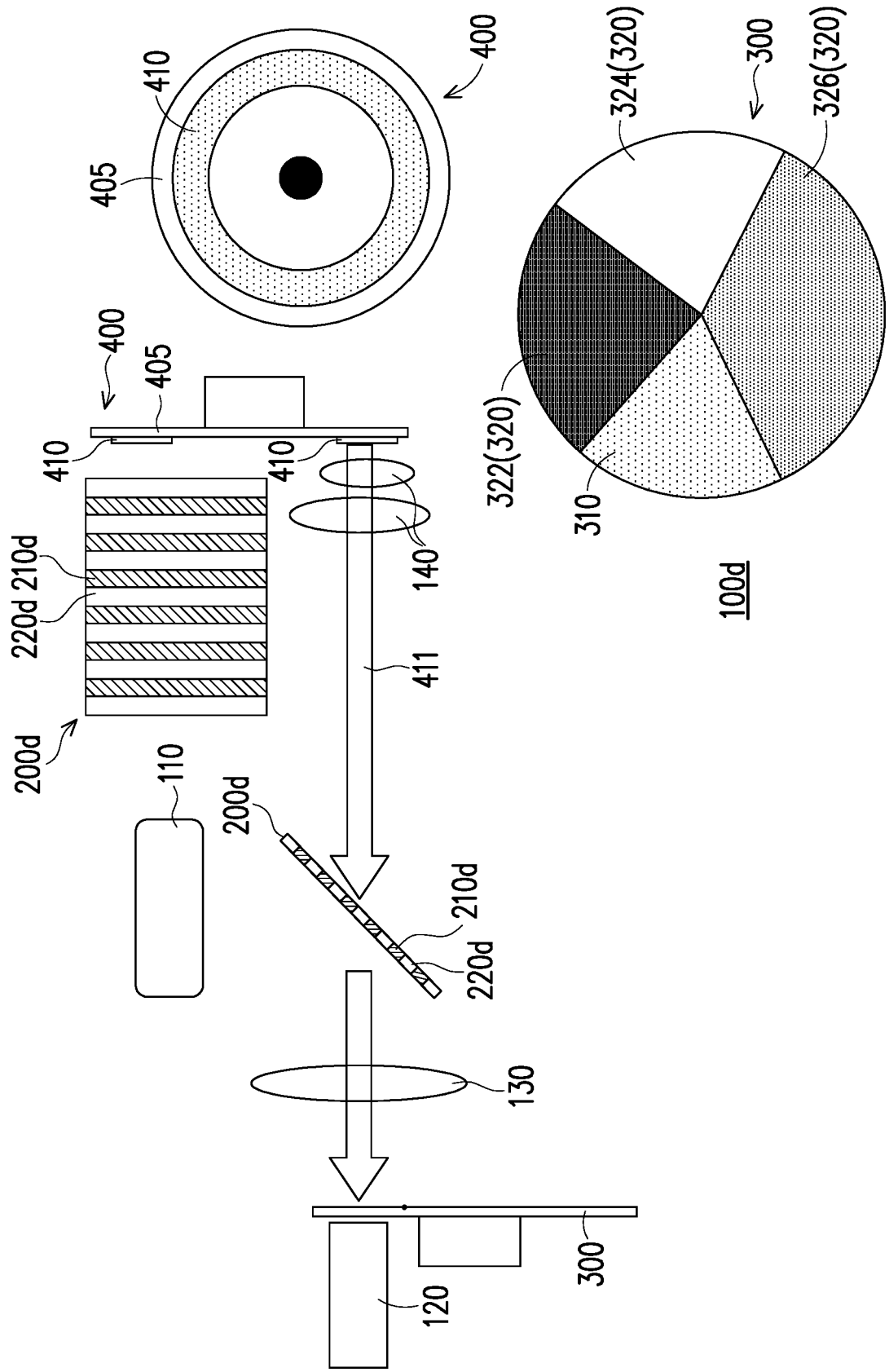
FIG. 5B is a light path schematic diagram of a converted light beam of the illumination system of FIG. 5A.

FIG. 5A is a light path schematic diagram of excitation light beams of an illumination system according to yet another embodiment of the disclosure, and FIG. 5B is a light path schematic diagram of a converted light beam of the illumination system of FIG. 5A. Referring to FIG. 5A and FIG. 5B, an illumination system 100d of the embodiment is similar to the illumination system 100 of FIG. 1A, and differences there between are as follows. In a multi-region dichroic device 200d of the illumination system 100d of the embodiment, the first dichroic regions 210d respectively reflect the excitation light beams 111 to the color sequence generator 300. In the embodiment, the first dichroic regions 210d may be formed by a plurality of strip-shaped dichroic films spaced apart from each other on a surface of a transparent substrate (for example, the surface facing the excitation light source array 110), and the dichroic films may reflect the blue light beams, and allow light beams of other colors to penetrate through. In addition, the non-dichroic regions 220d are a plurality of light-transmitting regions respectively allowing the excitation light beams 111 reflected by the at least one second dichroic region 320 to penetrate through to be transmitted to the wavelength converter 400. In the embodiment, at least one of two surfaces of the transparent substrate of the multi-region dichroic device 200d may be plated with an anti-reflection layer, so that light transmission efficiency of the light-transmitting region is improved, and the light-transmitting region is, for example, a transparent region. However, in another embodiment, the light-transmitting region may also be a hollow region of the transparent substrate.

After the wavelength converter 400 converts the excitation light beams 111 into the converted light beam 411 with the yellow-green color, the converted light beam 411 may penetrate through the first dichroic regions 210d and the non-dichroic regions 220d for being transmitted to the color sequence generator 300.

Figure 6:
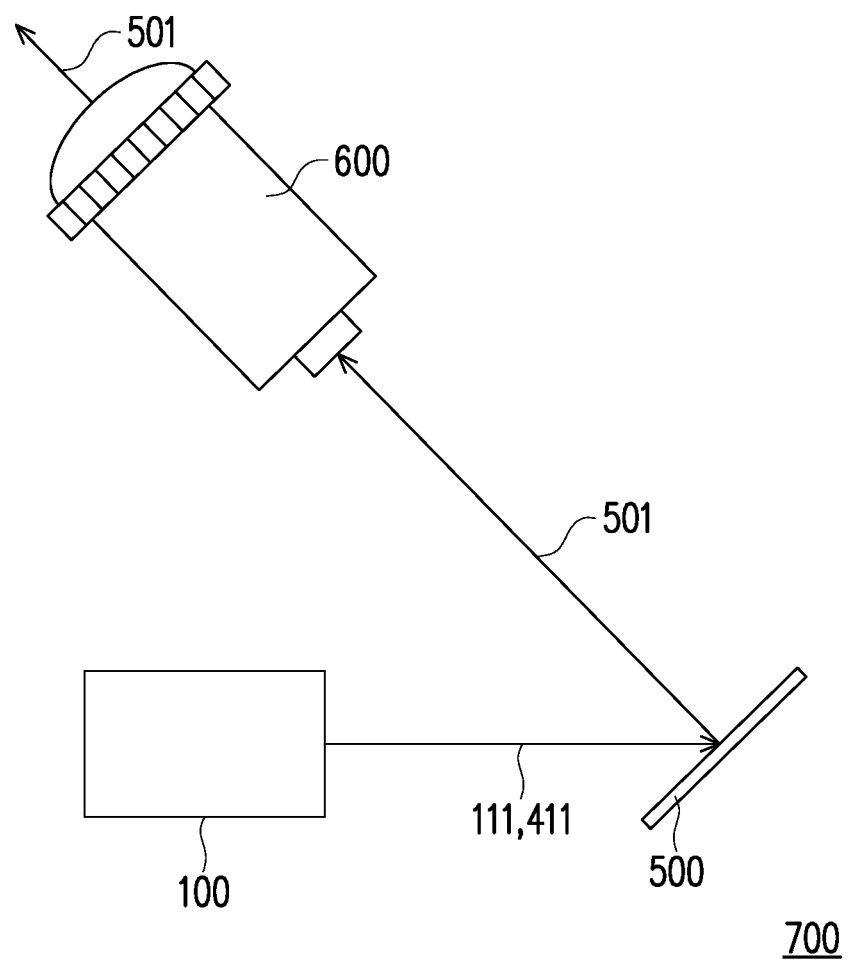
FIG. 6 is a light path schematic diagram of a projection apparatus according to an embodiment of the disclosure.

FIG. 6 is a light path schematic diagram of a projection apparatus according to an embodiment of the disclosure. Referring to FIG. 1A, FIG. 1B and FIG. 6, the illumination systems 100, 100b, 100c, and 100d of the above embodiments may all be configured in a projection apparatus 700 of the embodiment, and in the following description, the illumination system 100 of FIG. 1A is, for example, configured in the projection apparatus 700 of the embodiment. The projection apparatus 700 of the embodiment includes the illumination system 100, a light valve 500 and a projection lens 600. The light valve 500 is arranged on the transmission paths of the excitation light beams 111 and the converted light beam 411 coming from the color sequence generator 300, for example, configured on the transmission paths of the excitation light beams 111 and the converted light beam 411 coming from the light uniformizing element 120, so as to convert the excitation light beams 111 and the converted light beam 411 into an image light beam 501. In the embodiment, the light valve 500 is, for example, a digital micro-mirror device (DMD) or a liquid-crystal-on-silicon panel (LCOS panel). However, in other embodiments, the light valve 500 may also be a transmissive liquid crystal panel. The projection lens 600 is disposed on a transmission path of the image light beam 501 to project the image light beam 501 out of the projection apparatus 700, for example, to project the image light beam 501 on a screen to form an image.

In summary, in the illumination system and the projection apparatus of the embodiments of the disclosure, the excitation light beams emitted by the excitation light source array are transmitted to the color sequence generator to form passing light beams and light beams reflected to the wavelength converter at different timings. In this way, the structure of the wavelength converter is effectively simplified, the structural strength and the heat dissipation area of the wavelength converter are increased, the dynamic balance adjustment work hours of the wavelength converter are shortened, the light paths of the illumination system are simplified, the volume of the illumination system is reduced, and complexity of electronic control is decreased, and that the costs of the illumination system are effectively reduced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising an excitation light source array, a multi-region dichroic device, a color sequence generator, a wavelength converter, and a first light converging lens, wherein the excitation light source array is configured to emit a plurality of excitation light beams;

the multi-region dichroic device has a plurality of first dichroic regions and a plurality of non-dichroic regions that are alternately arranged in stripe shape, wherein the first dichroic regions are respectively arranged on transmission paths of the excitation light beams;

the color sequence generator has a light-transmitting region and at least one second dichroic region, wherein the excitation light beams from the excitation light source array are transmitted to the color sequence generator through the first dichroic regions of the multi-region dichroic device, the light-transmitting region and the at least one second dichroic region are sequentially cut into the transmission paths of the excitation light beams, the excitation light beams penetrate through the light-transmitting region when the light-transmitting region is located on the transmission paths of the excitation light beams, and the at least one second dichroic region respectively reflects the excitation light beams to the non-dichroic regions of the multi-region dichroic device when the at least one second dichroic region is located on the transmission paths of the excitation light beams;

the excitation light beams from the color sequence generator are transmitted to the wavelength converter by the non-dichroic regions of the multi-region dichroic device, the wavelength converter converts the excitation light beams into a converted light beam, the converted light beam is transmitted back to the multi-region dichroic device, the converted light beam is transmitted to the color sequence generator by the multi-region dichroic device, and at least a portion of the converted light beam penetrates through the at least one second dichroic region; and the first light converging lens is disposed between the multi-region dichroic device and the color sequence generator on the transmission paths of the excitation light beams, and the first light converging lens has a central optical axis, wherein the excitation light beams are configured to illuminate on a surface of the first light converging lens around the central optical axis, and configured to penetrate through the light-transmitting region of the color sequence generator.

2. The illumination system according to claim 1, wherein the first dichroic regions respectively allow the excitation light beams to penetrate through to be transmitted to the color sequence generator, and the non-dichroic regions are a plurality of reflective mirror regions respectively reflecting the excitation light beams reflected by the at least one second dichroic region to the wavelength converter.

3. The illumination system according to claim 1, wherein the first dichroic regions respectively reflect the excitation light beams to the color sequence generator, and the non-dichroic regions are a plurality of light-transmitting regions respectively allowing the excitation light beams reflected by the at least one second dichroic region to penetrate through to be transmitted to the wavelength converter.

4. The illumination system according to claim 1, further comprising the first light converging lens, configured to converge the excitation light beams coming from the first dichroic regions on the color sequence generator, and configured to transmit the excitation light beams reflected by the at least one second dichroic region to the non-dichroic regions.

5. The illumination system according to claim 4, wherein the central optical axis of the first light converging lens has an off-axis amount relative to a central optical axis of the excitation light source array.

6. The illumination system according to claim 1, wherein the wavelength converter is a wavelength conversion wheel suitable for rotation and has a wavelength conversion region, the wavelength conversion region is a complete ring-shaped region, and when the wavelength conversion wheel rotates, the excitation light beams irradiate within the complete ring-shaped region.

7. The illumination system according to claim 1, wherein the wavelength converter is a wavelength conversion wheel and has a wavelength conversion region, the wavelength conversion region is a C-shaped region, and when the wavelength conversion wheel rotates, the excitation light beams irradiate within the C-shaped region.

8. The illumination system according to claim 1, wherein the wavelength converter is a wavelength conversion wheel and has a wavelength conversion region, the wavelength conversion region is provided with a first wavelength conversion layer and a second wavelength conversion layer, the first wavelength conversion layer and the second wavelength conversion layer are sequentially cut into the transmission paths of the excitation light beams coming from the multi-region dichroic device, the first wavelength conversion layer converts the excitation light beams into a first converted light beam when the first wavelength conversion layer is located on the transmission paths of the excitation light beams, the second wavelength conversion layer converts the excitation light beams into a second converted light beam when the second wavelength conversion layer is located on the transmission paths of the excitation light beams, and the at least one second dichroic region comprises a first color filter region corresponding to the first converted light beam and a second color filter region corresponding to the second converted light beam for respectively allowing a portion of the first converted light beam and a portion of the second converted light beam to penetrate through.

9. The illumination system according to claim 1, further comprising a second light converging lens, disposed between the multi-region dichroic device and the wavelength converter, wherein a focal point at which the excitation light beams are converged by the second light converging lens is not coincided with a wavelength conversion surface of the wavelength converter.

10. The illumination system according to claim 1, further comprising:
 a second light converging lens, disposed between the multi-region dichroic device and the wavelength converter, configured to converge the excitation light beams on the wavelength converter; and
 a lens array or a diffuser plate, disposed between the multi-region dichroic device and the wavelength converter to uniformize light spots of the excitation light beams formed on the wavelength converter.

11. A projection apparatus, comprising an illumination system, a light valve, and a projection lens, wherein
 the illumination system comprises an excitation light source array, a multi-region dichroic device, a color sequence generator, a wavelength converter, and a first light converging lens, wherein
 the excitation light source array is configured to emit a plurality of excitation light beams,
 the multi-region dichroic device has a plurality of first dichroic regions and a plurality of non-dichroic regions that are alternately arranged in stripe shape, wherein the first dichroic regions are respectively arranged on transmission paths of the excitation light beams, the color sequence generator has a light-transmitting region and at least one second dichroic region, wherein the excitation light beams from the excitation light source array are transmitted to the color sequence generator through the first dichroic regions of the multi-region dichroic device, the light-transmitting region and the at least one second dichroic region are sequentially cut into the transmission paths of the excitation light beams, the excitation light beams penetrate through the light-transmitting region when the light-transmitting region is located on the transmission paths of the excitation light beams, and the at least one second dichroic region respectively reflects the excitation light beams to the non-dichroic regions of the multi-region dichroic device when the at least one second dichroic region is located on the transmission paths of the excitation light beams, the excitation light beams from the color sequence generator are transmitted to the wavelength converter by the non-dichroic regions of the multi-region dichroic device, the wavelength converter converts the excitation light beams into a converted light beam, the converted light beam is transmitted back to the multi-region dichroic device, the converted light beam is transmitted to the color sequence generator by the multi-region dichroic device, and at least a portion of the converted light beam penetrates through the at least one second dichroic region, the first light converging lens is disposed between the multi-region dichroic device and the color sequence generator on the transmission paths of the excitation light beams, and the first light converging lens has a central optical axis, wherein the excitation light beams are configured to illuminate on a surface of the first light converging lens around the central optical axis, and configured to penetrate through the light-transmitting region of the color sequence generator, the light valve is disposed on the transmission paths of the excitation light beams and the converted light beam coming from the color sequence generator to convert the excitation light beams and the converted light beam into an image light beam, and the projection lens is arranged on a transmission path of the image light beam to project the image light beam out of the projection apparatus.

12. The projection apparatus according to claim 11, wherein the first dichroic regions respectively allow the excitation light beams to penetrate through to be transmitted to the color sequence generator, and the non-dichroic regions are a plurality of reflective mirror regions respectively reflecting the excitation light beams reflected by the at least one second dichroic region to the wavelength converter.

13. The projection apparatus according to claim 11, wherein the first dichroic regions respectively reflect the excitation light beams to the color sequence generator, and the non-dichroic regions are a plurality of light-transmitting regions respectively allowing the excitation light beams reflected by the at least one second dichroic region to penetrate through to be transmitted to the wavelength converter.

14. The projection apparatus according to claim 11, wherein the first light converging lens is configured to converge the excitation light beams coming from the first dichroic regions on the color sequence generator, and the first light converging lens is configured to transmit the excitation light beams reflected by the at least one second dichroic region to the non-dichroic regions.

15. The projection apparatus according to claim 14, wherein the central optical axis of the first light converging lens has an off-axis amount relative to a central optical axis of the excitation light source array.

16. The projection apparatus according to claim 11, wherein the wavelength converter is a wavelength conversion wheel suitable for rotation and has a wavelength conversion region, the wavelength conversion region is a complete ring-shaped region, and when the wavelength conversion wheel rotates, the excitation light beams irradiate within the complete ring-shaped region.

17. The projection apparatus according to claim 11, wherein the wavelength converter is a wavelength conversion wheel, the wavelength conversion region is a C-shaped region, and when the wavelength conversion wheel rotates, the excitation light beams irradiate within the C-shaped region.

18. The projection apparatus according to claim 11, wherein the wavelength converter is a wavelength conversion wheel and has a wavelength conversion region, the wavelength conversion region is provided with a first wavelength conversion layer and a second wavelength conversion layer, the first wavelength conversion layer and the second wavelength conversion layer are sequentially cut into the transmission paths of the excitation light beams coming from the multi-region dichroic device, the first wavelength conversion layer converts the excitation light beams into a first converted light beam when the first wavelength conversion layer is located on the transmission paths of the excitation light beams, the second wavelength conversion layer converts the excitation light beams into a second converted light beam when the second wavelength conversion layer is located on the transmission paths of the excitation light beams, and the at least one second dichroic region comprises a first color filter region corresponding to the first converted light beam and a second color filter region corresponding to the second converted light beam for respectively allowing a portion of the first converted light beam and a portion of the second converted light beam to penetrate through.

19. The projection apparatus according to claim 11, wherein the illumination system further comprises a second light converging lens, disposed between the multi-region dichroic device and the wavelength converter, wherein a focal point at which the excitation light beams are converged by the second light converging lens is not coincided with a wavelength conversion surface of the wavelength converter.

20. The projection apparatus according to claim 11, wherein the illumination system further comprises:
a second light converging lens, disposed between the multi-region dichroic device and the wavelength converter, configured to converge the excitation light beams on the wavelength converter; and
a lens array or a diffuser plate, disposed between the multi-region dichroic device and the wavelength converter to uniformize light spots of the excitation light beams formed on the wavelength converter.

* * * * *